(12) United States Patent
Sasagawa et al.

(10) Patent No.: US 10,926,344 B2
(45) Date of Patent: Feb. 23, 2021

(54) TAPER REAMER

(71) Applicant: ISHII CORPORATION CO., LTD., Niigata (JP)

(72) Inventors: Yasushi Sasagawa, Niigata (JP); Yuichi Hirokawa, Niigata (JP); Hiroshi Saito, Niigata (JP); Takumi Abe, Niigata (JP); Shunsuke Sakuma, Niigata (JP); Yuki Ogiue, Niigata (JP); Satoshi Koike, Niigata (JP); Mitsuru Otaki, Niigata (JP); Hiroto Kanda, Niigata (JP); Suguru Machiya, Niigata (JP); Hifumi Okada, Niigata (JP)

(73) Assignee: ISHII CORPORATION CO., LTD., Niigata (JP)

( * ) Notice: Subject to any disclaimer, the term of this patent is extended or adjusted under 35 U.S.C. 154(b) by 0 days.

(21) Appl. No.: 16/638,076

(22) PCT Filed: Aug. 28, 2018

(86) PCT No.: PCT/JP2018/031650
§ 371 (c)(1),
(2) Date: Feb. 10, 2020

(87) PCT Pub. No.: WO2019/044791
PCT Pub. Date: Mar. 7, 2019

(65) Prior Publication Data
US 2020/0215631 A1  Jul. 9, 2020

(30) Foreign Application Priority Data
Aug. 30, 2017 (JP) .............................. JP2017-165835

(51) Int. Cl.
*B23D 77/12* (2006.01)
*B23D 77/00* (2006.01)

(52) U.S. Cl.
CPC ........... *B23D 77/12* (2013.01); *B23D 77/003* (2013.01); *B23D 77/006* (2013.01); *B23D 2277/105* (2013.01); *B23D 2277/52* (2013.01)

(58) Field of Classification Search
CPC .. B23D 77/003; B23D 77/12; B23D 2277/52; B23D 2277/105
See application file for complete search history.

(56) References Cited

U.S. PATENT DOCUMENTS

| 4,740,121 A * | 4/1988 | Arnold | B23D 77/003 408/224 |
| 8,708,618 B2 * | 4/2014 | Hobohm | B23D 77/00 408/1 R |

(Continued)

FOREIGN PATENT DOCUMENTS

| CH | 419788 A | * 8/1966 | ........... B23D 77/003 |
| CH | 482486 A | * 12/1969 | ............. B23D 77/00 |

(Continued)

OTHER PUBLICATIONS

International Search Report dated Oct. 16, 2018 in PCT Application No. PCT/JP2018/031650.

*Primary Examiner* — Eric A. Gates
(74) *Attorney, Agent, or Firm* — Fox Rothschild LLP (57) ABSTRACT

Provided is a taper reamer with which it is possible to achieve an improvement in machining accuracy and machining life. The taper reamer comprises a plurality of cutting edges each having a helical shape provided on the outer periphery of a cutting-edge portion having an external diameter being expanded from a front end toward a rear end thereof, wherein an intertooth angle, defined between each of a pair of the cutting edges adjacently arranged in a circumferential direction, is different from one another at any given reference position, and wherein the plurality of cutting edges each have a helix angle that is different from (Continued)

one another. As the plurality of cutting edges that are unequally partitioned each have the helix angle that is different from one another, a resonance during cutting can be prevented.

10 Claims, 9 Drawing Sheets

(56) References Cited

U.S. PATENT DOCUMENTS

| | | | |
|---|---|---|---|
| 2011/0013998 A1 | 1/2011 | Tardivo | |
| 2012/0208146 A1* | 8/2012 | Mordeniz | B23D 77/12 |
| | | | 433/102 |
| 2013/0337407 A1* | 12/2013 | Mordeniz | A61C 5/42 |
| | | | 433/102 |
| 2017/0028482 A1 | 2/2017 | Boulakhov et al. | |

FOREIGN PATENT DOCUMENTS

| | | | | | |
|---|---|---|---|---|---|
| DE | 1627238 | A1 | * | 12/1970 | ........... B23D 77/003 |
| DE | 2910828 | A1 | * | 9/1980 | ........... B23D 77/003 |
| EP | 1561535 | A1 | * | 8/2005 | ........... B23D 77/006 |
| FR | 897062 | A | * | 3/1945 | ........... B23D 77/003 |
| GB | 563402 | A | * | 8/1944 | ........... B23D 77/003 |
| JP | 63-47015 | | | 2/1988 | |
| JP | 63-47016 | | | 2/1988 | |
| JP | H03-109722 | | | 11/1991 | |
| JP | H05-253742 | A | | 10/1993 | |
| JP | H09-272015 | A | | 10/1997 | |
| JP | 2006-181677 | A | | 7/2006 | |
| JP | 2008194779 | A | | 8/2008 | |
| WO | 2013/005307 | | | 1/2013 | |

* cited by examiner

TAPER REAMER

CROSS-REFERENCE TO RELATED APPLICATIONS

This application is a § 371 national phase entry of International Patent Application No. PCT/JP2018/031650, filed on Aug. 28, 2018, which claims priority to and the benefit of Japanese Patent Application No. 2017-165835, filed on Aug. 30, 2017, both of which are hereby incorporated herein by reference in their entireties.

TECHNICAL FIELD

The present disclosure relates to a taper reamer for machining into a tapered hole

BACKGROUND ART

Conventionally, as this type of taper reamer, there is known a taper reamer for use in roughing into a tapered hole, comprising a plurality of cutting edges provided on an outer periphery of a tool body, wherein the cutting edges on the outer periphery make a stepwise profile, wherein the respective peaks for the steps are inscribed on a virtual circular cone having a predefined taper angle, and the respective edge lines of the cutting edges, extending from the respective peaks toward the shank, are angled in a range of from 0° to 90° with respect to the tool axis (See, for example, patent document 1). Further, there is known a taper reamer having a cutting-edge portion provided with a plurality of cutting edges formed on a front part side of a shank part to be held by a machining tool, wherein the cutting-edge portion is provided with 6 to 10 tapered-down cutting edges, the lead angles α of the cutting edges are each set to be 4° to 6°, and the rake angles of which are each set to be 8° to 12°, and the blade tips of the cutting edges each have a round land of 0.05 to 0.15 mm (see, for example, patent document 2). Furthermore, there is known a taper reamer comprising a cutting fluid flow channel for discharging a cutting agent to a blade part, wherein the cutting fluid flow channel extends from the base end section to the front end section of the blade part, and wherein the blade part is provided with cutting edges extending along the axial direction at an equal interval circumferentially around the blade part (see, for example, patent document 3).

The above-noted taper reamers utilize processing in which a pilot hole is drilled in a workpiece, and then the pilot hole is forming into a tapered hole by means of a roughing taper reamer. After that, this tapered hole is finished to a predetermined finishing accuracy by using a finishing taper reamer.

Figure 12A:
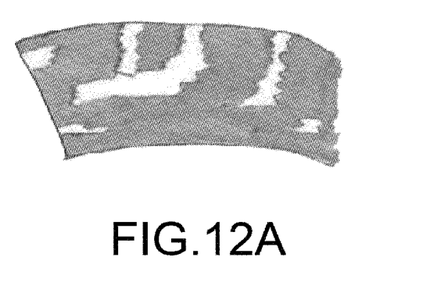
FIG. 12A illustrates a hole with defects caused by chatters.
Figure 12B:
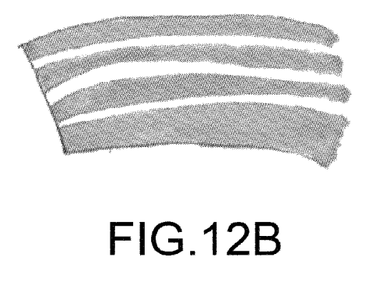
FIG. 12B illustrates a hole having line-shaped marks made by chatters.
Figure 13A:
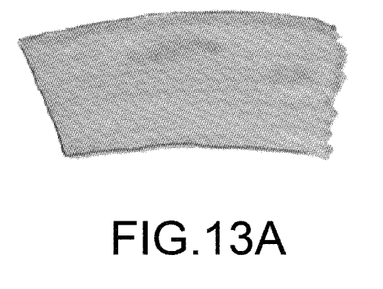
FIG. 13 is an explanatory view of a tapered hole that is in a favorable machining state.
Figure 13B:
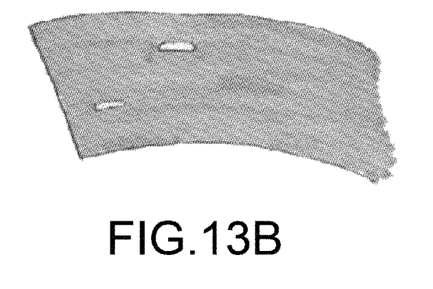

Unfortunately, such taper reamers, having a plurality of cutting edges that are formed at regular intervals, cause vibration generated by receiving a cutting resistance associated with the rotation of the cutting edges. FIG. 12 illustrates machined surfaces that are highlighted by a red lead primer in which FIG. 12A shows a machined surface that is affected by a chatter (colorless areas), which impairs finishing accuracy. In addition, if chattering or the like causes chipping on a cutting edge, as shown in FIG. 12B, linear marks (colorless areas) corresponding to the broken portions are formed, thus posing a risk of processing defect and reduced working lifetime of the reamers. Here, FIGS. 13A and 13B show favorable working surfaces without being affected by any chatter or the like.

In addition, in the field of the reamer with straight cutting edges which is not a taper reamer, there is known a technique of preventing chatters by means of an unequally partitioned reamer having a plurality of straight cutting edges whose intertooth intervals are each arranged to be different from one another (see, for example, Patent document 4).

However, in contrast to such reamer having straight cutting edges, since the distal end of a taper reamer is formed in a tapered manner, the taper reamer is subjected to a stress in the axis direction of the reamer during cutting, and tends to have larger cutting resistance compared to a reamer having straight cutting edges. Further, in a case of an equally partitioned reamer, where the cutting edges are equally spaced from each other, there is generated a resonance associated with a cutting resistance exerted at a constant period on the cutting edges, which further generates a vibration mainly in the mode corresponding to the direction in which the reamer and the workpiece are moving apart from each other. In this case, the workpiece is moved toward the reamer feeding direction, or the reamer is moved toward the reamer counter-feeding direction, or both of the cases take place at the same time. In any case, as the vibration takes place in a manner reciprocated in the central axis of the reamer, the reamer is subjected to chattering and chipping, which causes processing defects and reduced working lifetime.

The inventors have found out, as a result of an examination that is unofficially conducted, that an unequally partitioned taper reamer contributes to a decrease in processing defect and an improvement in working lifetime as compared to that which is equally partitioned, and as a result of earnest research for achieving more accurate processing accuracy and improvement in working lifetime, the present inventions have been archived.

PRIOR ART DOCUMENTS

Patent Documents

Patent document 1: Japanese Unexamined Patent Application Publication No. H05-253742
Patent document 2: Japanese Unexamined Patent Application Publication No. H09-272015
Patent document 3: Japanese Unexamined Patent Application Publication No. 2006-181677
Patent document 4: Japanese Unexamined Patent Application Publication No. 2008-194779

SUMMARY OF THE INVENTION

Problem to be Solved by the Invention

The problem to be solved is to provide a taper reamer that makes it possible to achieve improvement in working accuracy and working lifetime as compared to prior arts.

Means to Solve the Problem

A first aspect of the present invention is a taper reamer provided with a plurality of cutting edges each having a helical shape provided on the outer periphery of a cutting-edge portion having an external diameter being expanded from a front end toward a rear end thereof, characterized in that an intertooth angle, defined between each of a pair of the cutting edges adjacently arranged in a circumferential direction is different from one another at any given reference position, and that the plurality of cutting edges each have a helix angle that is different from one another.

A second aspect of the present invention is a taper reamer, wherein the number of the cutting edges is three or more, and said given reference position is set to be at the front end of the cutting-edge portion.

A third aspect of the present invention is a taper reamer, wherein the number of the cutting edges is three or more, wherein a chip removal flute is formed between each of a pair of the cutting edges adjacently arranged in a circumferential direction, and wherein at least one of the intertooth angles is defined to be degressively decreased from the front end toward the rear end, while the remaining intertooth angles are defined to be progressively increased from the front end toward the rear end.

A fourth aspect of the present invention is a taper reamer, wherein the number of the cutting edges is three, wherein a chip removal flute is formed between each of a pair of the cutting edges adjacently arranged in a circumferential direction, and wherein one of the intertooth angles is defined to be degressively decreased from the front end toward the rear end, while the remaining intertooth angles are defined to be progressively increased from the front end toward the rear end, and a minimal intertooth angle at the rear end of the cutting-edge portion is defined to be not smaller than 0.5 times as large as 120°.

A fifth aspect of the present invention is a taper reamer, wherein the minimal intertooth angle at the rear end of the cutting-edge portion is defined to be not smaller than 0.8 times as large as 120°.

A sixth aspect of the present invention is a taper reamer, wherein the three cutting edges, defined as first to third cutting edges, each have a helix angle that is different from one another, the third cutting edge is arranged next to the first cutting edge with reference to a revolving direction of the first cutting edge, and the second cutting edge is arranged next to the first cutting edge with reference to a counter-revolving direction of the first cutting edge, the third cutting edge has a helix angle larger than the helix angle of the first cutting edge and the second cutting edge has a helix angle smaller than the helix angle of the first cutting edge, and an intertooth angle defined between the second cutting edge and the third cutting edge is larger than any other intertooth angles at the front end of the cutting-edge portion, and an intertooth angle defined between the first cutting edge and the second cutting edge is smaller than any other intertooth angles at the front end of the cutting-edge portion.

A seventh aspect of the present invention is a taper reamer, wherein the difference between the helix angle of the third cutting edge and the helix angle of the second cutting edge is smaller than or equal to 5°.

Effects of the Invention

According to the first aspect, since the plurality of cutting edges unequally-partitioned each have a helix angle $\alpha 1$, $\alpha 2$, $\alpha 3$ that is different from one another, a resonance during cutting can be prevented.

According to the second aspect, since the three or more unequally-partitioned cutting edges each have a helix angle that is different from one another, a resonance during cutting can be prevented.

According to the third aspect, the chip removal flute can have a sufficient width for smoothly removing cutting chips.

According to the fourth aspect, the chip removal flute can have a sufficient width at the rear end of the cutting-edge portion provided with the three cutting edges to thereby smoothly remove cutting chips.

According to the fifth aspect, the chip removal flute can have a sufficient width at the rear end of the cutting-edge portion provided with the three cutting edges to thereby more smoothly remove cutting chips. If angle difference among the intertooth angles becomes too large, the differences in cutting resistances exerted on the respective cutting edges correspondingly become too large, which may result in a curved hole or deterioration in circularity. In contrast to such a case, the differences in cutting resistance exerted on the cutting edges may be suppressed if the minimal intertooth angle is set to be not smaller than 0.8 times as large as 120°.

According to the sixth aspect, the intertooth angle, taking the maximum value at the front end S of the cutting-edge portion, degressively decreases from the front end toward the rear end, and the intertooth angle, taking the minimum value at the front end of the cutting-edge portion, progressively increases from the front end toward the rear end. As a result, the chip removal flute can have a sufficient width at the rear end of the cutting-edge portion provided with the three cutting edges, defined as first to third cutting edges, to thereby more smoothly remove cutting chips.

According to the seventh aspect, there can be formed three cutting edges such that the chip removal flute has a sufficient width. In contrast to this case, if angle differences among the helix angles are set to be too large, the cutting edges can have an uneven arrangement, which make is difficult for the chip removal flute to have a sufficient width.

BRIEF DESCRIPTION OF THE DRAWINGS

FIG. 6 is an explanatory drawing of the cutting-edge portion in which FIG. 6A is a front view, and FIGS. 6B to 6E each illustrate a cross-sectional view of the cutting-edge portion at a position away from the front end by a given pitch according to the first embodiment.

FIG. 11 is an explanatory view of the cutting-edge portion according to a third embodiment in which FIG. 11A is a front view, and FIGS. 11B to 11E each illustrate a cross-sectional view of the cutting-edge portion at a position away from the front end by a given pitch.

FIG. 12 is an explanatory view of a tapered hole in which

DESCRIPTION OF EMBODIMENTS

Preferred embodiments of the present invention will be described in detail with reference to the accompanying drawings. The embodiments described below may not limit the scope of the present invention described in the claims. In addition, not all of the configurations described below are necessarily essential requirements of the present invention. As will be illustrated in each of the embodiments below, a non-conventional taper reamer may be obtained by adopting a new taper reamer which is different from the conventional one.

Embodiment 1

FIGS. 1 to 9 illustrate embodiment 1 of the present invention in which a taper reamer 1 includes a shank portion 2 that is provided in a rear-end portion of the reamer to be gripped by a machine tool. The taper reamer 1 also includes a cutting-edge portion 3 in a front-end portion of the reamer in which the cutting-edge portion 3 is expanded in a tapered manner from the front end toward the rear end, and the cutting-edge portion 3 has a given taper angle $\theta t$. On the outer periphery of the cutting-edge portion 3 is provided three cutting edges 11, 12, 13 (the number of the blades being three) between which a chip removal flute 21 is formed for each pair of the cutting edges 11, 12, 13 that are adjacently arranged with each other in the circumferential direction.

The taper reamer 1 is formed of a hard metal such as cemented carbide alloy. The taper reamer 1 rotates about the central axis 4 in the revolving direction T, with the shank portion 2 being held on a spindle of the machine tool, to be fed in the longitudinal direction to perform a cutting work on a workpiece.

The cutting edges 11, 12, 13 are each formed in a spiral manner such that, on the outer circumference of the cutting-edge portion 3, the cutting edges 11, 12, 13 are each provided with a rake face 22 that faces toward the revolving direction T and that also fillips a part of the chip removal flute 21. To the counter-revolving direction side from each of the cutting edges 11, 12, 13, there is provided a margin 23 formed in an arc-like form along the circumferential direction. Provision of the margin 23 provides an effect of the burnishing effect, which results in a smooth machined surface and improved surface smoothness.

A primary relief face 24 and a secondary relief face 25 are defined successively from the margin 23 toward the counter-revolving direction. As the primary relief face 24 and the secondary relief face 25 have different inclination angles from each other, an intersecting ridge line 26 is formed between them.

The rake face 22 has a rake angle $\theta s$ of 1 to 10° (1° or more and 10° or less). In this example, the rake angle $\theta s$ is of 2 to 8°. The margin 23 has a circumferential width Wm of about 0.08 to 0.35 mm, preferably about 0.13 to 0.3 mm. The margin 23 is formed in an arc-like manner along the circumferential direction, and the radius of the arc is about 10 to 30 mm.

The primary relief face 24 has a circumferential width W1 of 0.3 to 0.62 mm, preferably about 0.35 to 0.57 mm. The angle $\theta 24$ of the primary relief face 24 with respect to the tangential line of each of the cutting edges 11, 12, 13 is about 8 to 18°. Further, the angle $\theta 25$ of the secondary relief face 25 with respect to the tangential line of each of the cutting edges 11, 12, 13 is about 20 to 32°, which is greater than the angle $\theta 24$. The edge 25T of the secondary relief face 25 is located at a position away from an outer circumferential line G (an outer circumferential line of the cutting-edge portion 3) inwardly toward the central axis 4 in the radial direction by a radial width W2 which is a width in said radial direction, where the outer circumferential line G passes through the edges of the cutting edges 11, 12, 13, and is centered on the central axis 4. The radial width W2 is about 0.2 to 0.8 mm. The tangential angle of the outer circumference of the cutting-edge portion 3 becomes greater than the angle $\theta 25$ as the position on the outer circumference goes beyond the edge 25T toward the counter-revolving direction.

Figure 1:
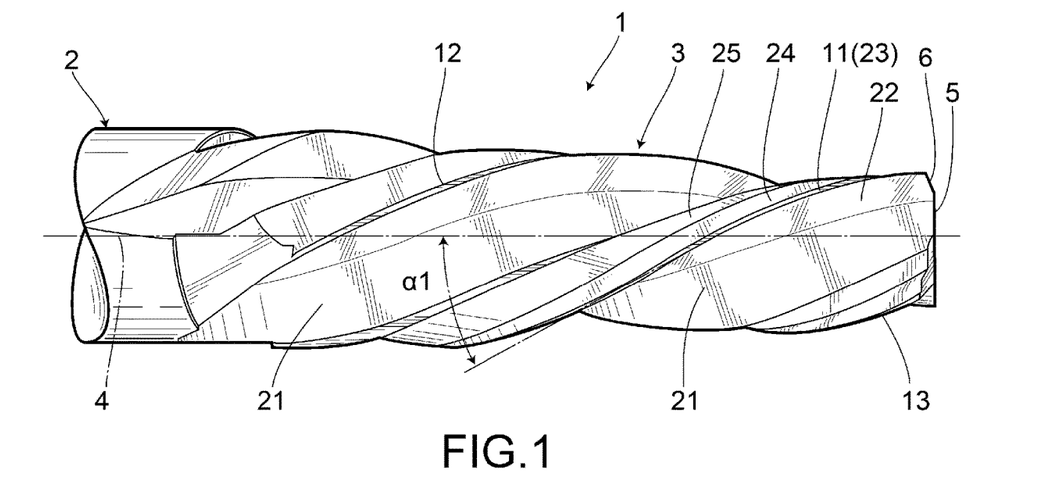
FIG. 1 is a side view illustrating a first embodiment of the present invention.
Figure 2:
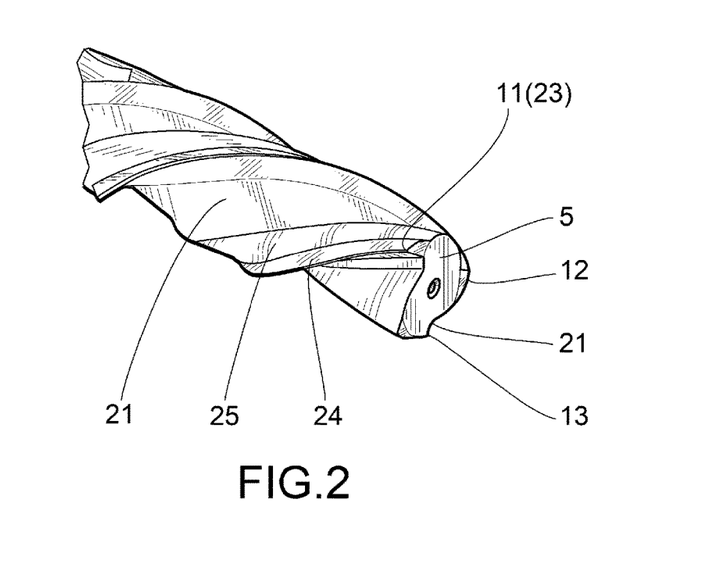
FIG. 2 is a perspective view of a front side illustrating the first embodiment of the present invention.
Figure 3:
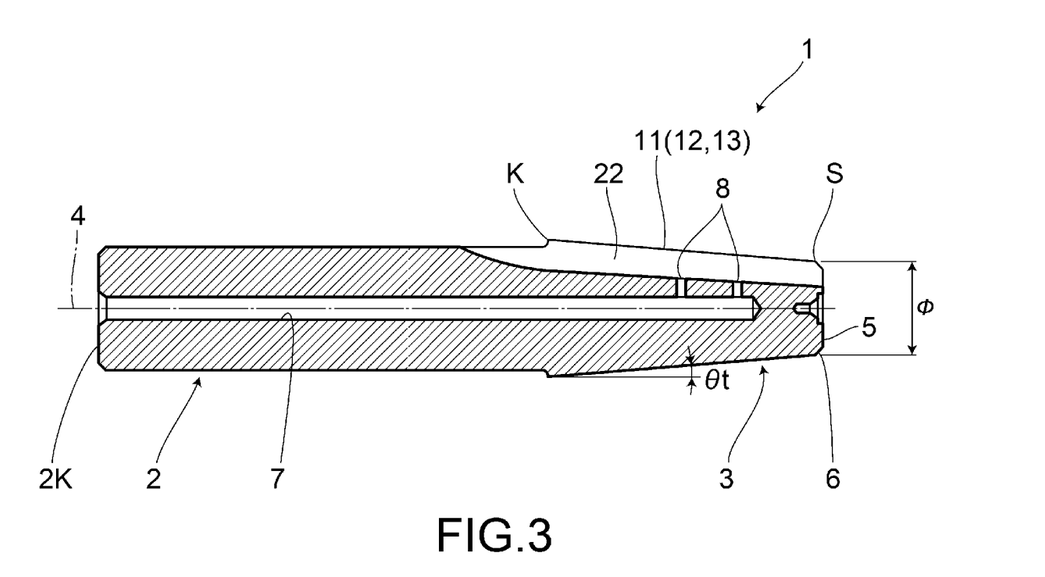
FIG. 3 is a cross-sectional view illustrating the first embodiment of the present invention.
Figure 4:
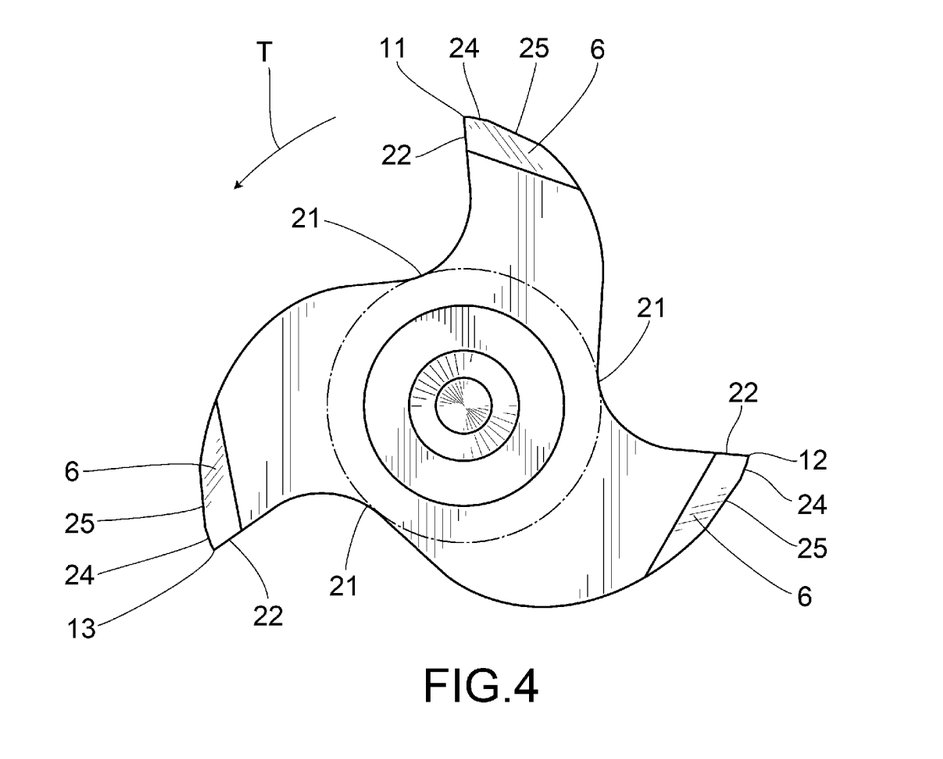
FIG. 4 is an enlarged front view illustrating the first embodiment of the present invention.
Figure 5:
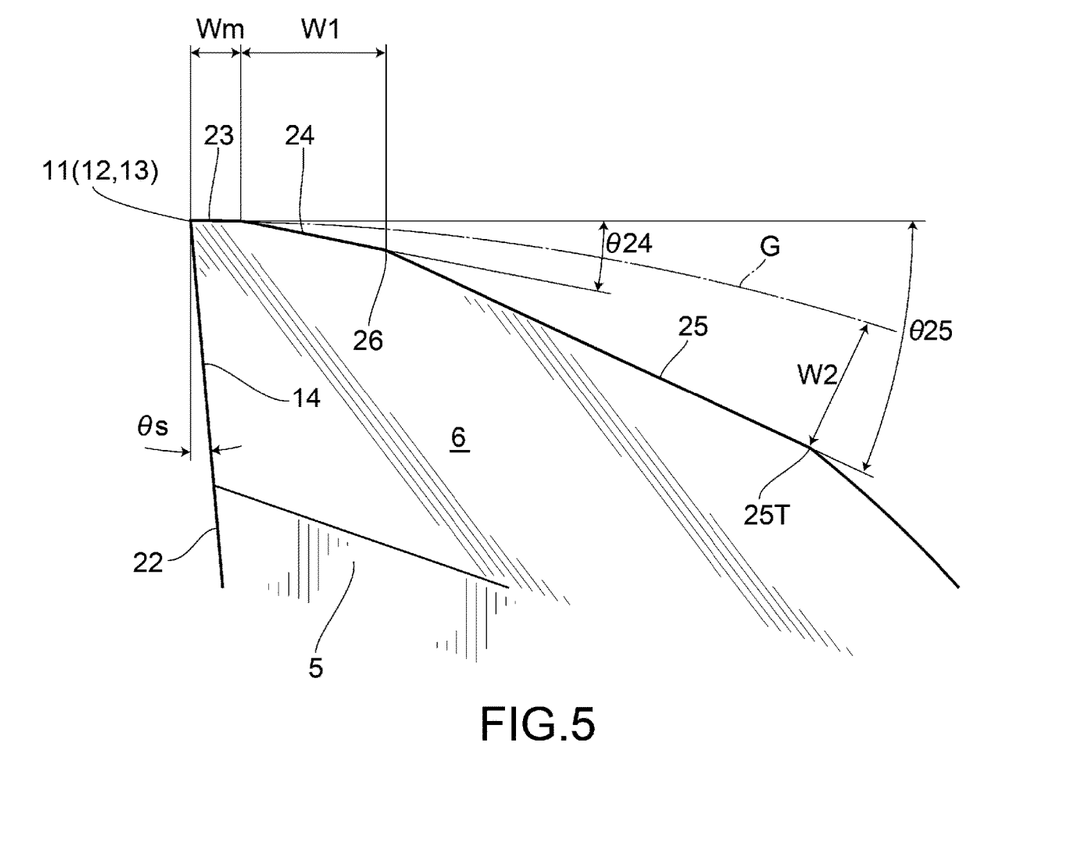
FIG. 5 is an enlarged cross-sectional view around a cutting edge thereof illustrating the first embodiment of the present invention.

As shown in FIG. 3, between the outer circumferential of a distal face 5 of the cutting-edge portion 3 and each of the cutting edges 11, 12, 13 is formed a chamfered portion 6 that is chamfered at 45°. Further, as shown in FIG. 5, a cutting-edge tip portion 14 is defined between the chamfered portion 6 and the rake face 22, and as shown in FIG. 3, a front end S of the cutting edge 11, 12, 13 is located at the rear end of the chamfered portion 6. The cutting-edge tip portion 14 is located between the front end S of the cutting edge 11, 12, 13 and the distal face 5.

The taper reamer 1 is provided with a cutting fluid flow channel 7 that is formed along the central axis 4 and is extended from a proximal end face 2K of the shank portion 2, which is the rear end, to the front end side of the cutting-edge portion 3. In a distal portion of the cutting fluid flow channel 7, there are formed a plurality of branch channels 8, 8 that open out into the respective chip removal flutes 21, 21, 21. The branch channels 8, 8 are formed at an interval along a longitudinal direction of the taper reamer 1.

A cutting fluid is supplied to the cutting fluid flow channel 7 by a cutting fluid supply means (not shown). The cutting fluid is further supplied through the branch channels 8 to the outer periphery of the cutting-edge portion 3. The cutting fluid may be supplied thereto in a mist form.

Figure 6:
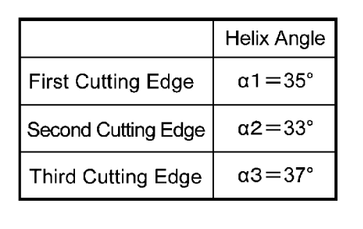

The above-described taper reamer 1 has the following features. The first to third cutting edges 11, 12, 13 are formed so as to have different intertooth angles that are each defined as an angle at the front end S between the cutting edges 11, 12, 13 that are adjacently arranged from each other. As illustrated in FIGS. 6 and 7, at the front end S, the first cutting edge 11 and the second cutting edge 12 circumferentially define an intertooth angle $\theta 1$ of 100°, the second cutting edge 12 and the third cutting edge 13 circumferentially define an intertooth angle $\theta 2$ of 140°, and the third cutting edge 13 and the first cutting edge 11 circumferentially define an intertooth angle $\theta 3$ of 120°. As shown, the plurality of cutting edges 11, 12, 13 are arranged in an unequally partitioned manner. In this example, the front end S is the reference position for the intertooth angles $\theta 1$, $\theta 2$, $\theta 3$.

Further, the first to third cutting edges 11, 12, 13 have helix angles (lead angles) $\alpha 1$, $\alpha 2$, $\alpha 3$ that are different from each other. For example, the helix angle $\alpha 1$ for the first cutting edge 11 may be of 35°, the helix angle $\alpha 2$ for the second cutting edge 12 may be of 33°, and the helix angle $\alpha 3$ for the third cutting edge 13 may be of 37°, so that all of the helix angles $\alpha 1$, $\alpha 2$, $\alpha 3$ for the plurality of cutting edges 11, 12, 13 are different from each other. Further, the plurality of cutting edges 11, 12, 13 are arranged such that the respective helix angle $\alpha 1$, $\alpha 2$, $\alpha 3$ are set to have a constant interval in angle differences. That is, in a case when the helix angle $\alpha 2$ is defined as the minimum, the other helix angles $\alpha 1$ or $\alpha 3$ is set to be $\theta + n \cdot D$, where $\theta$ represents the minimum intertooth angle and n is a natural number. The difference D in this example is set to be 2°.

The cutting edges 11, 12, 13 define helix angles α1, α2, α3 whose measures of the angles are set in accordance with the magnitudes of the intertooth angles θ3, θ1, θ2 which respectively correspond to the cutting edges 11, 12, 13 in the revolving direction T at the front end S. For example, as the cutting edge 13 has a corresponding intertooth angle θ2 (of 140°) in the revolving direction T at the front end S, it is the cutting edge 13 that has the maximum helix angle α3 (of 37°). Also, as the cutting edge 12 has a corresponding intertooth angle θ1 (of 100°) in the revolving direction T at the distal end, it is the cutting edge 12 who has the minimal helix angle α2 (of 33°).

As shown, if the helix angles α1, α2, α3 are set to be different from each other at the front end S of the cutting edges 11, 12, 13 that are adjacent from each other, as the helix angle of a cutting edge that is preceding in revolving direction T is set to be smaller than the helix angle of a cutting edge that goes after the preceding cutting edge in revolving direction T, the corresponding intertooth angle at the rear end K of the cutting-edge portion 3 is correspondingly set to be small. If the intertooth angle at the rear end K of the cutting-edge portion 3 is set to be small such that the chip removal flute 21 becomes too narrow, the chips may not be removed smoothly.

As such, the cutting edges 11, 12, 13 are set to have a maximum intertooth angle θ2 at the front end S, where the maximum intertooth angle θ2 is determined such that the corresponding pair of adjacent cutting edges 11, 12, 13 takes the negative maximum helix angle difference that is set to be an angle difference between a helix angle α1, α2, α3 for a preceding cutting edge in the revolving direction T and a helix angle α2, α3, α1 for the adjacent cutting edge that goes after the preceding cutting edge. If the helix angle for the cutting edge that precedes in the revolving direction T has a helix angle that is smaller than the helix angle for the cutting edge that goes after it in the revolving direction T, the corresponding intertooth angle tapers down toward the rear end at which the chip removal flute 21 become reduced in size. The intertooth angles are defined at the front end S such that the intertooth angle becomes reduced from the maximum intertooth angle θ2 at the constant 20° interval in the counter-revolving direction of the taper reamer 1. That is, the intertooth angle θ3 is smaller by 20° than the intertooth angle θ2, and the intertooth angle θ1 is smaller by 20° than the intertooth angle θ3.

Figure 6A:
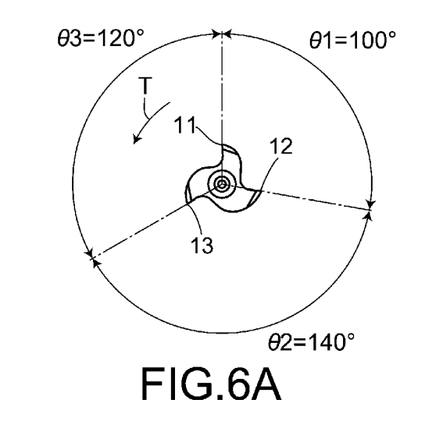
Figure 6B:
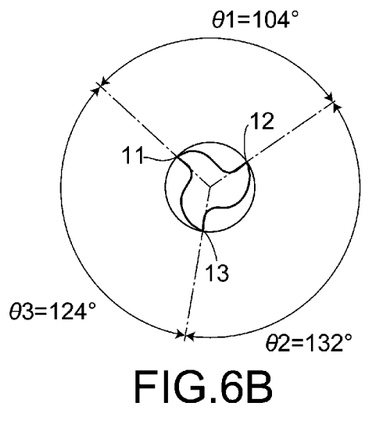
Figure 6C:
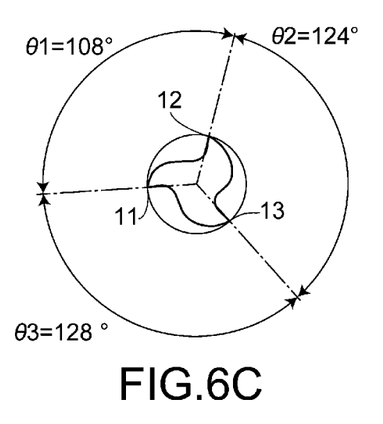
Figure 6D:
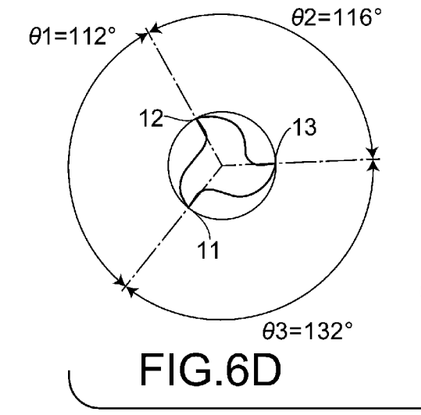
Figure 6E:
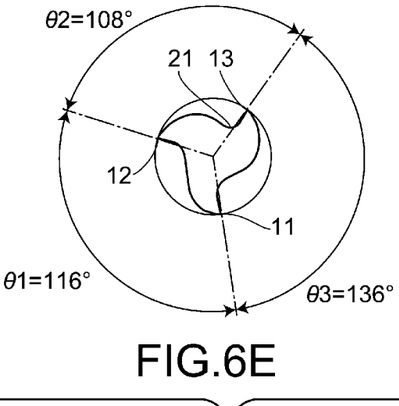
Figure 7A:
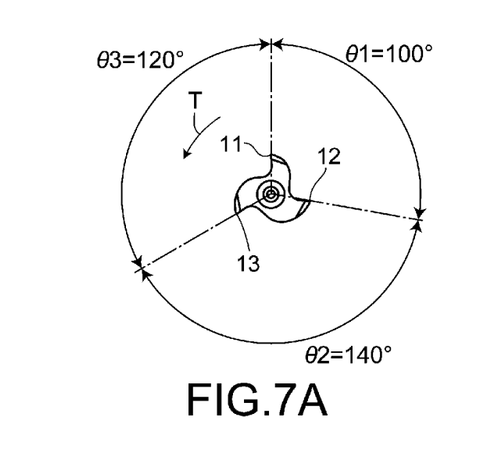
FIG. 7 is an explanatory drawing of the cutting-edge portion in which the first cutting edges are shown on the top in FIGS. 6A to 6E.
Figure 7B:
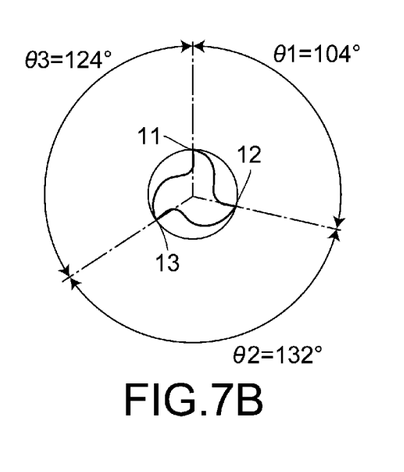
Figure 7C:
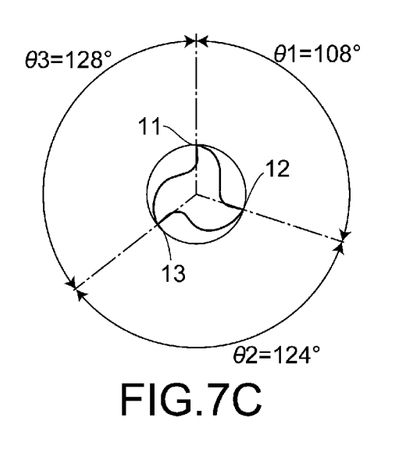
Figure 7D:
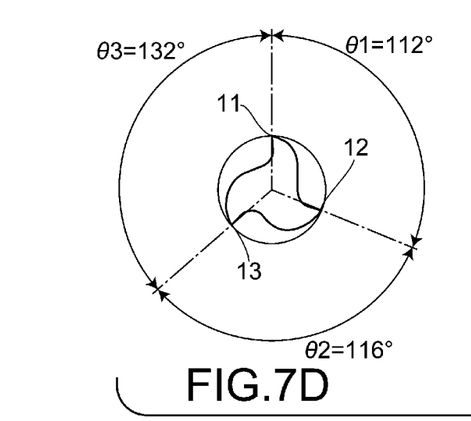
Figure 7E:
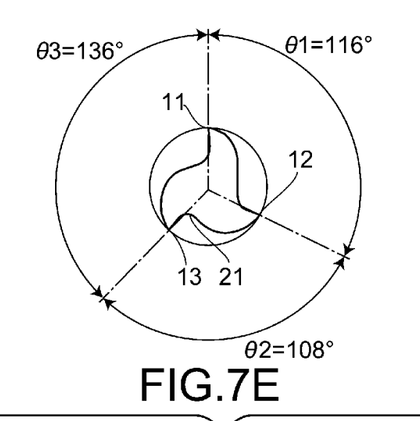

FIG. 6A is a front view of the cutting-edge portion 3. FIGS. 6B to 6E are cross-sectional views of the cutting-edge portion 3 at respective positions separated from the front end S by a predetermined pitch. For example, FIG. 6B is a cross-sectional view at a position separated from the front end S by 12 mm, and FIG. 6E is a cross-sectional view at a position separated from the front end S by 48 mm. FIG. 7 shows views in which the first cutting edge 11 is arranged at the top in FIG. 6.

Figure 8:
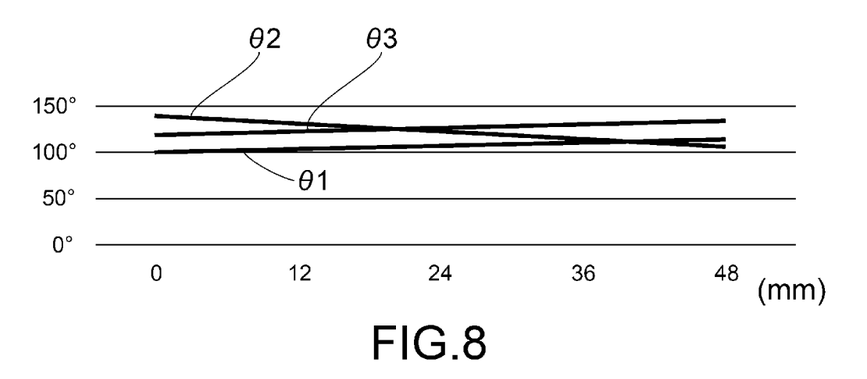
FIG. 8 is a graphic representation illustrating intertooth angles according to the first embodiment.

FIG. 8 shows a graph that illustrates intertooth angle (by the unit of °) as a vertical axis with respect to a distance (by the unit of mm) from the front end S as a horizontal axis. As shown in the figure, the intertooth angles θ1 and θ3 increase progressively from the front end S toward the rear end K in proportion to a distance from the front end S, and the intertooth angle θ2 that is the maximum intertooth angle decreases degressively from the front end S toward the rear end K in proportion to a distance from the front end S. Further, there are found two positions at which two of the three intertooth angles θ1, θ2, θ3 take the same intertooth angle. However, there can be found no position where the three intertooth angles θ1, θ2, θ3 take the same intertooth angle.

The maximum and minimum angle values among the intertooth angles θ1, θ2, θ3 are respectively 140° and 100° at the front end S, while at the rear end K, the maximum and minimum angle values among the intertooth angles θ1, θ2, θ3 are respectively 136° and 108°. Further, the maximum angle value among the intertooth angles θ1, θ2, θ3 at the rear end K is smaller than that at the front end S, and the minimal angle value among the intertooth angles θ1, θ2, θ3 at the rear end K is larger than that at the front end S. As a result, the chip removal flutes 21 are allowed to have a sufficient width at the rear end K.

By the setting as described above, the intertooth angle θ2, which takes the negative maximum helix angle difference at the front end S, may be set at the rear end K as 108° which is greater than 100°. As a result, the chip removal flutes 21 are allowed to have a sufficient width at the rear end K. In the case of three blades as shown in the example, if the blades are equally partitioned, the intertooth angles are all set to be 120°. With reference to this case, the intertooth angle θ2 that takes minimum value at the rear end K is set to be 108° at the rear end K, thus ensuring an intertooth angle greater than 90% of 120°, which allows the chip removal flute 21, having an intertooth angle of 108° at the rear end, to smoothly remove cutting chips to the rear end. As shown, the intertooth angles θ1, θ2, θ3 at the rear end K are set to be 10% smaller than those at the front end S. In the case of three blades of cutting edges, the chip removal flute 21 may have a sufficient width if the decreased amount is computationally set to be less than 50%, preferably less than 20%. That is, the minimal intertooth angle θ2 at the rear end K may be set to be not smaller than 0.5 times, preferably 0.8 times, more preferably not smaller than 0.9 times as large as 120° that is an angle of 360° divided by three (the number of the blade) so as to ensure a sufficient width of the chip removal flute 21 at the rear end K.

Further, as shown in FIG. 8, the intertooth angles θ1, θ2, and θ3 vary proportionally from the position of 0 mm at the front end S toward the position of 48 mm at the rear end K. From the position of 0 mm at the front end S toward the position of 48 mm at the rear end K, as the intertooth angle θ1 progressively increases from 100° to 116°, the intertooth angle θ2 degressively decreases from 140° to 108°, and the intertooth angle θ3 progressively increases from 120° to 136°. The second and third angles θ2, θ3 take the same value at the position away from the front end S by 20 mm, and the first and second angles θ1, θ2 take the same value at the position away from the front end S by 40 mm. The two positions, where two intertooth angles take the same value, are 20 mm apart from each other. As shown, the three intertooth angles θ1, θ2, θ3 never take the same value at the same position along the axial direction of the cutting-edge portion 3, and the two positions, where two intertooth angles take the same value, are apart from each other by 10 mm or more. In this way, there can be effectively prevented a resonance during cutting for any taper reamer 1, having three cutting edges 11, 12, and 13.

Hereinafter, working examples will be described. As for the taper reamer 1 in this working example, the distance along the axis from the distal face 5 to the chamfered portion 6 is set to be 1 mm, the diameter D of the reamer at the front end S is set to be 16.5 mm, the diameter of the reamer at the rear end K is set to be 24.5 mm, the taper angle θt of the cutting-edge portion 3 is set to be 4° 46′, and the length from the distal face 5 to the rear end K of the cutting-edge portion 3 is set to be 49 mm. The working example and a comparative example 1 are different in that the cutting edges of the comparative example 1 are equally partitioned and the helix angles are all set to be 35°. Moreover, the working example and a comparative example 2 are different in that the cutting edges of the comparative example 2 each have a helix angle of 35°.

The rake angle $\theta s$ is set to be 5°. The circumferential width Wm of the margin 23 is set to be 0.18 mm, and the radius of the arc of the margin 23 is set to be 8.25 mm. Further, the primary relief face 24 has a circumferential width W1 of 0.52 mm, the angle $\theta 24$ is set to be 11°, the angle $\theta 25$ is set to be 25° and the radial width W2 is set to be 0.5 mm.

Figure 9A:
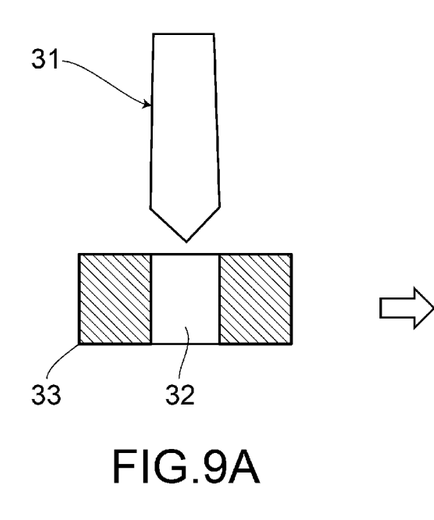
FIG. 9 is a cross-sectional view illustrating how the tapered hole is processed.
Figure 9B:
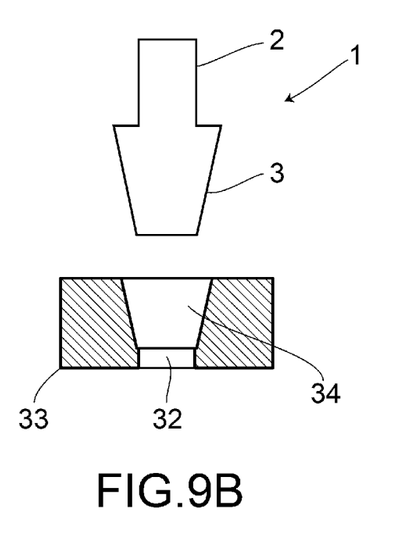

As shown in FIG. 9, a pre-drilled hole 32 was drilled on a workpiece 33, and then the pre-drilled hole 32 was formed into a tapered hole 34 by mean of the taper reamer 1 without using any roughing taper reamer for finishing. Cutting speed of 98.1 m/min and feed rate of 1349 mm/min were employed as cutting conditions for the tapered hole 34. The feeding rate (or feed amount per revolution) of 0.9 mm/rev was achieved for the working example in term of workability, while the corresponding feeding rates of 0.1 mm/rev and 0.3 mm/rev were respectively achieved for the comparative examples 1 and 2, which exhibits durability of the working example being ten times durable than that of the comparative example 1. As another working example, helix angle $\alpha 1$, $\alpha 2$, $\alpha 3$ were respectively set to be 30°, 28° and 32° to conduct another examination, which similarly showed a favorable result. As shown, favorable results were achieved when the helix angles $\alpha 1$, $\alpha 2$, $\alpha 3$ were in the range of 30° to 37°.

As for the above described taper reamer 1, the plurality of cutting edges 11, 12, 13 are unequally partitioned, and the helix angles $\alpha 1$, $\alpha 2$, $\alpha 3$ of the cutting edges 11, 12, 13 are all different from each other. As a result, the plurality of cutting edges 11, 12, 13 are unevenly arranged over the whole length of the cutting-edge portion 3 to thereby prevent a resonance during cutting, and thus to improve workability and working lifetime.

A first aspect of the present embodiment provides a taper reamer 1 with a plurality of cutting edges 11, 12, 13 each having a helical shape provided on the outer periphery of a cutting-edge portion 3 having an external diameter being expanded from a front end toward a rear end thereof, wherein an intertooth angle $\theta 1$, $\theta 2$, $\theta 3$, defined between each of a pair of the cutting edges adjacently arranged in a circumferential direction, is different from one another at any given reference position, and that the plurality of cutting edges each have a helix angle $\alpha 1$, $\alpha 2$, $\alpha 3$ that is different from one another. As a result, since the plurality of cutting edges 11, 12, 13 that are unequally partitioned each have a helix angle $\alpha 1$, $\alpha 2$, $\alpha 3$ that is different from one another, a resonance during cutting can be prevented and cutting resistance can be suppressed to thereby achieve an improvement in working accuracy and cutting tool lifetime.

As shown in the second aspect of the present embodiment, there are provided three or more blades of the cutting edges 11, 12, 13, wherein said given reference position is set to be at the front end of the cutting-edge portion 3. Since the unequally partitioned cutting edges 11, 12, 13 of three or more blades each have a helix angle $\alpha 1$, $\alpha 2$, $\alpha 3$ that is different from one another, a resonance during cutting can be prevented.

As shown in the third aspect of the present embodiment, there are provided three or more blades of the cutting edges, wherein a chip removal flute 21 is formed between each of a pair of the cutting edges adjacently arranged in a circumferential direction, and wherein at least one of the intertooth angles $\theta 2$ is defined to be degressively decreased from the front end S toward the rear end K, while the remaining intertooth angles $\theta 1$, $\theta 3$ are defined to be progressively increased from the front end S toward the rear end K. As a result, the chip removal flute 21 can have a sufficient width for smoothly removing cutting chips.

In this embodiment, there may be provided three cutting edges 11, 12, 13 with the number of the chip removal flutes 21, 21, 21 being equal to the number of the cutting edges 11, 12, 13. As a result, one intertooth angle $\theta 2$ may be defined to be degressively decreased from the front end S toward the rear end K. In a case of four blades of the cutting edges, four chip removal flutes are provided, where one or two intertooth angles are set to be degressively decreased from the front end toward the rear end, while the remaining two or three intertooth angles are set to be progressively increased from the front end toward the rear end. In a case of five blades of the cutting edges, five chip removal flutes are provided, where one or two intertooth angles are set to be degressively decreased from the front end toward the rear end, while the remaining four or three intertooth angles are set to be progressively increased from the front end toward the rear end. As shown, if there are provided three or more blades of the cutting edges, an integer of less than half of the number of the cutting edges may be set to be degressively decreased from the front end toward the rear end, while the remaining intertooth angles may be set to be progressively increased from the front end toward the rear end.

As shown in the fourth aspect of the present embodiment, three cutting edges 11, 12, 13 are provided, wherein a chip removal flute 21 is formed between each of a pair of the cutting edges 11, 12, 13 adjacently arranged in a circumferential direction, and wherein one of the intertooth angles is defined to be degressively decreased from the front end S toward the rear end K, while the remaining intertooth angles are defined to be progressively increased from the front end toward the rear end, and the minimal intertooth angle $\theta 2$ at the rear end K of the cutting-edge portion 3 is defined to be 108° which is not smaller than 0.5 times as large as 120°. As a result, the chip removal flute 21 can have a sufficient width at the rear end K of the cutting-edge portion 3 provided with the three cutting edges 11, 12, 13 to thereby smoothly remove cutting chips.

As shown, the cutting edges 12 and 13 between which a maximum intertooth angle $\theta 2$ is defined at the front end S are set to have respective helix angles $\alpha 2$ and $\alpha 3$ such that the intertooth angle $\theta 2$ therebetween becomes degressively narrower from the front end S toward the rear end K. Further, the cutting edges 11 and 12 between which a minimum intertooth angle $\theta 1$ is defined at the front end S are set to have respective helix angles $\alpha 1$ and $\alpha 2$ such that the intertooth angle $\theta 1$ therebetween is set to be progressively wider from the front end S toward the rear end K. Furthermore, the remaining intertooth angle $\theta 3$ takes a value in a range between the maximum intertooth angle $\theta 2$ and the minimum intertooth angle $\theta 1$ at the front end S, and the cutting edges 11 and 13 between which the intertooth angle $\theta 3$ is defined are respectively set to have helix angles $\alpha 1$ and $\alpha 3$ such that the intertooth angle $\theta 3$ therebetween is set to be progressively wider from the front end S toward the rear end K. In this example, an angle difference between the maximum and minimum values among the helix angles $\alpha 1$, $\alpha 2$, $\alpha 3$ is set to be 4° ($\alpha 3 - \alpha 2$) which is within the range of 5°. It is preferable that the angle difference is set within the range of 5° as shown in this embodiment. Moreover, in this example, an angle difference D between the helix angle $\alpha 3$ for the third cutting edge 13 and the helix angle $\alpha 1$ for the first cutting edge 11 is equal to the angle difference D between the helix angle $\alpha 1$ for the third cutting edge 11 and the helix angle $\alpha 1$ for the second cutting edge 12.

As shown in the fifth aspect of the present embodiment, a minimal intertooth angle $\theta 2$ at the rear end K of the cutting-edge portion 3 is defined to be not smaller than 0.8 times as large as 120°. As a result, the chip removal flute 21 can have a sufficient width at the rear end K of the cutting-edge portion 3 provided with the three cutting edges 11, 12, 13 to thereby more smoothly remove cutting chips. If angle difference among the intertooth angles $\theta 1$, $\theta 2$, $\theta 3$ becomes too large, the differences in cutting resistance respectively exerted on the respective cutting edges 11, 12, 13 correspondingly become too large, which may result in a curved hole or deterioration in circularity. In contrast to this case, the differences between cutting resistances exerted on the respective cutting edges 11, 12, 13 may be suppressed if the minimal intertooth angle is set to be not smaller than 0.8 times as large as 120°.

As shown in the sixth aspect of the present embodiment, the three cutting edges, defined as first to third cutting edges 11, 12, 13, each have a helix angle $\alpha 1$, $\alpha 2$, $\alpha 3$ that is different from one another, the third cutting edge 13 is arranged next to the first cutting edge 11 with reference to a revolving direction T of the first cutting edge 11, and the second cutting edge 12 is arranged next to the first cutting edge 11 with reference to a counter-revolving direction of the first cutting edge 11, the third cutting edge 13 has a helix angle $\alpha 3$ larger than the helix angle $\alpha 1$ of the first cutting edge 11 and the second cutting edge 12 has a helix angle $\alpha 2$ smaller than the helix angle $\alpha 1$ of the first cutting edge 11, and an intertooth angle $\theta 2$ defined between the second cutting edge 12 and the third cutting edge 13 is larger than any other intertooth angles $\theta 1$, $\theta 3$ at the front end S of the cutting-edge portion 3, and an intertooth angle $\theta 1$ defined between the first cutting edge 11 and the second cutting edge 12 is smaller than any other intertooth angles $\theta 2$, $\theta 3$ at the front end S of the cutting-edge portion 3. For this reason, the intertooth angle $\theta 2$, taking the maximum value at the front end S of the cutting-edge portion 3, degressively decreases from the front end S toward the rear end K, and the intertooth angle $\theta 1$, taking the minimum value at the front end S of the cutting-edge portion 3, progressively increases from the front end S toward the rear end K. As a result, the chip removal flute 21 can have a sufficient width at the rear end K of the cutting-edge portion 3 provided with the three cutting edges, defined as first to third cutting edges 11, 12, 13, to thereby more smoothly remove cutting chips.

As shown in the seventh aspect of the present embodiment, an angle difference between the helix angle $\alpha 3$ for the third cutting edge 13 and the helix angle $\alpha 2$ for the second cutting edge 12 is set to be not greater than 5°, which is not greater than 4° in this example. As a result, there can be formed three cutting edges 11, 12, 13 such that the chip removal flute 21 have a sufficient width. In contrast to this case, if angle differences among the helix angle $\alpha 1$, $\alpha 2$, $\alpha 3$ are set to be too large, the cutting edges 11, 12, 13 can have an uneven arrangement, which make is difficult for the chip removal flute 21 to have a sufficient width.

As an advantage of the embodiments, the cutting edges 11, 12, 13 may define helix angles $\alpha 1$, $\alpha 2$, $\alpha 3$ whose measures of the angles are set in accordance with the magnitudes of the intertooth angles $\theta 3$, $\theta 1$, $\theta 2$ at the front end S which respectively correspond to the cutting edges 11, 12, 13 in the revolving direction T. As a result, the chip removal flute 21 can have a sufficient width at the rear end K.

Further, at the front end S of the cutting-edge portion 3, the intertooth angle $\theta 2$ between the second cutting edge 12 and the third cutting edge 13 is set to be larger than the intertooth angle $\theta 3$ between the third cutting edge 13 and the first cutting edge 11, and the intertooth angle $\theta 3$ between the third cutting edge 13 and the first cutting edge 11 is set to be larger than the intertooth angle $\theta 1$ between the first cutting edge 11 and the second cutting edge 12. As a result, the chip removal flute 21 can have a sufficient width at the rear end K of the cutting-edge portion 3 provided with the three cutting edges, defined as first to third cutting edges 11, 12, 13, to thereby more smoothly remove cutting chips.

Further, at the front end S of the cutting-edge portion 3, the intertooth angles $\theta 1$, $\theta 2$, $\theta 3$ are be set to be 0.8 to 1.2 times as large as 120° that is an angle of 360° divided by three, preferably not smaller than 120°−20° and not greater than 120°−20°. Furthermore, the intertooth angles $\theta 1$, $\theta 2$, $\theta 3$ at the rear end K are be set to be 0.8 to 1.2 times as large as 120°, and the intertooth angles $\theta 1$, $\theta 2$, $\theta 3$ are set to be 0.8 to 1.2 times as large as 120° over the whole length of the cutting-edge portion 3. As a result, the chip removal flute 21 can have a sufficient width at the rear end K, and the taper reamer 1 of the three blades can achieve a favorable rotary cutting with three blades without significantly losing its cutting balance so as to suppress the differences in cutting resistance exerted on the respective cutting edges 11, 12, 13 and to prevent a curved hole or deterioration in circularity.

Further, as shown in FIG. 8, there can be found no position from the front end S where the first to third intertooth angles $\theta 1$, $\theta 2$, $\theta 3$ take the same value. Furthermore, an angle difference D between the helix angle $\alpha 3$ for the third cutting edge 13 and the helix angle $\alpha 1$ for the first cutting edge 11 is equal to the angle difference D between the helix angle $\alpha 1$ for the third cutting edge 11 and the helix angle $\alpha 2$ for the second cutting edge 12 so that the angle difference between the intertooth angles $\theta 1$ and $\theta 3$ is set to be constant over the whole length of the cutting edges 11, 12, 13. In this example, an angle difference between the intertooth angles $\theta 1$ and $\theta 3$ is set to be not smaller than 0.15 times as large as 120° (which is 20° in this embodiment), and the angle difference between the intertooth angles $\theta 1$ and $\theta 3$ is kept at the same value of the front end S even at a position where the second and third intertooth angles $\theta 2$ and $\theta 3$ take the same value (or a position away from the front end by 20 mm as shown in FIG. 8) and also at a position where the first and second intertooth angles $\theta 1$ and $\theta 2$ take the same value (or a position away from the front end by 40 mm as shown in FIG. 8). For these reasons, a vibration generated during cutting can be effectively prevented from happening over the whole length of the cutting edges 11, 12, 13.

Further, the position where the second and third intertooth angles $\theta 2$ and $\theta 3$ take the same value and the position where the first and second intertooth angles $\theta 1$ and $\theta 2$ take the same value are set apart from each other by equal to or more than one third of the whole length of the cutting edges 11, 12, 13. For this reason, a vibration generated during cutting can be effectively prevented from happening.

Embodiment 2

Figure 10:
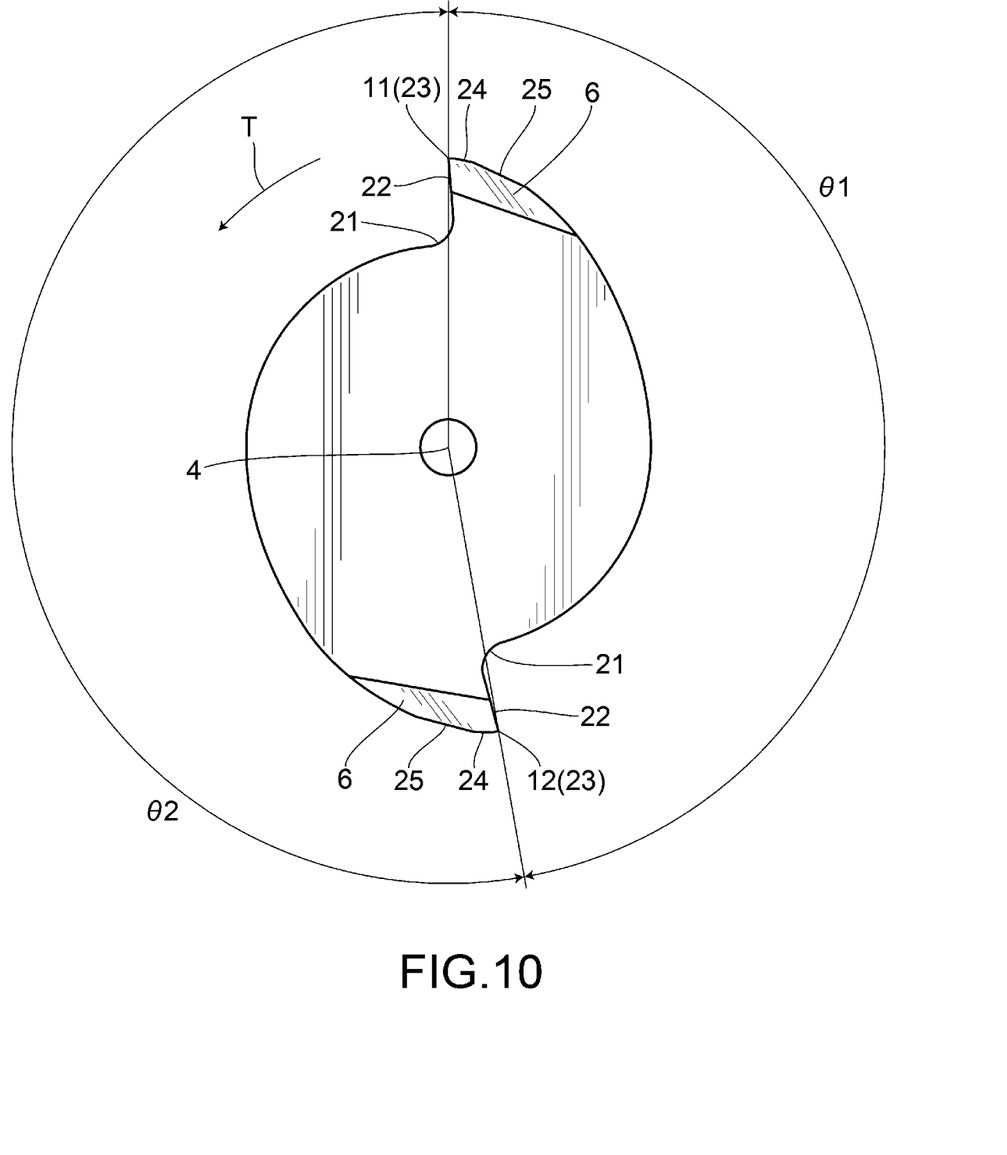
FIG. 10 is an enlarged front view illustrating a second embodiment of the present invention.

FIG. 10 shows a second embodiment of the present invention, in which the same parts as those in the first embodiment are denoted by the same reference numerals, and the description thereof will be omitted. In this embodiment, cutting edges 11, 12 of two blades are employed, where the intertooth angles θ1, θ2 of the cutting edges 11, 12 are set to be 170° and 190° which are different from each other, and one cutting edge 11 has a helix angle α1 of 35°, while the other cutting edge 12 has a helix angle α2 of 32°.

Further, since the cutting edge 11 has the maximum intertooth angle θ2 in the revolving direction T at the front end S, it is the cutting edge 11 that has the maximum helix angle α1.

As shown in the first aspect of the present embodiment, there is provided a taper reamer 1 with a plurality of cutting edges 11, 12 each having a helical shape provided on the outer periphery of a cutting-edge portion 3 having an external diameter being expanded from a front end toward a rear end thereof, characterized in that an intertooth angle θ1, θ2, defined between each of a pair of the cutting edges adjacently arranged in a circumferential direction, is different from one another at the front end S which is set as a reference position, and that the plurality of cutting edges 11, 12 each have a helix angle α1, α2 that is different from one another. As a result, since the plurality of cutting edges 11, 12 that are unequally partitioned each have a helix angle α1, α2 that is different from one another, a resonance during cutting can be prevented.

Embodiment 3

Figure 11:
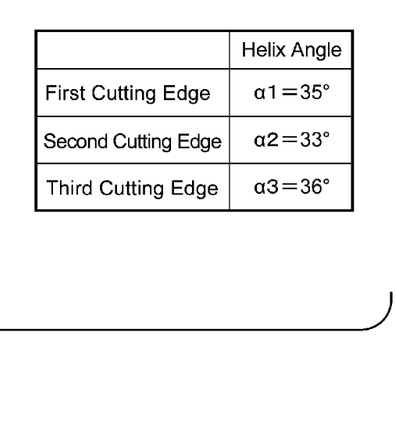
Figure 11A:
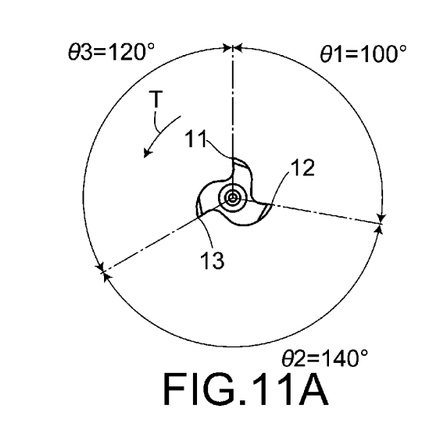
Figure 11B:
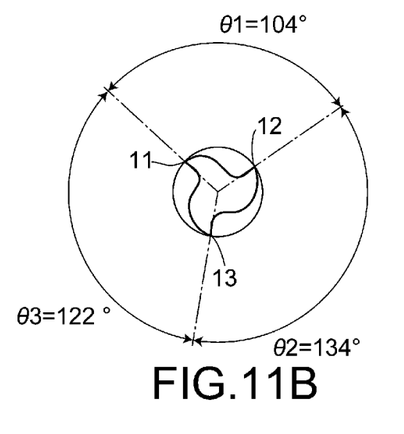
Figure 11C:
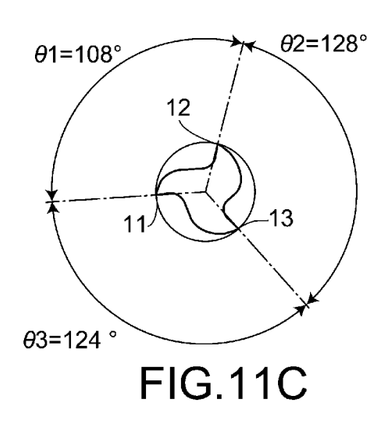
Figure 11D:
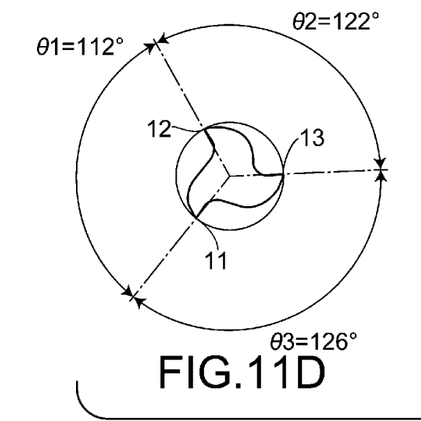
Figure 11E:
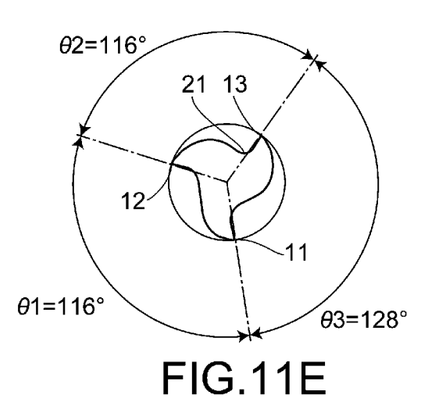

FIG. 11 shows a third embodiment of the present invention, in which the same parts as those in the above embodiments are denoted by the same reference numerals, and the detailed description thereof will be omitted. In this embodiment, the taper reamer 1 of the first embodiment has a third cutting edge 13 with a helix angle of 36°, where the angle difference between the maximum and minimum values among the helix angles α1, α2, α3 is set to be 3° (α3−α2) which is within the range of 5°.

As shown, this embodiment has an advantage similar to the above-noted embodiments as already described in which the angle difference between the helix angle α3 for the third cutting edge 13 and the helix angle α2 for the second cutting edge 12 is set to be 5° or less, which is 3° in this example. As a result, there can be formed three cutting edges 11, 12, 13 such that the chip removal flutes 21 have a sufficient width. That is, as shown in this example, the angle difference D between the helix angle α3 for the third cutting edge 13 and the helix angle α1 for the first cutting edge 11 may be different to the angle difference D between the helix angle α1 for the third cutting edge 11 and the helix angle α2 for the second cutting edge 12.

It should be noted that the present inventions are not limited to the above embodiments, and various modifications can be made within the scope of the present invention. For example, the present inventions can be applied to a taper reamer having cutting edges of not less than four blades. Further, it is preferable that the minimum intertooth angle at the rear end of the cutting-edge portion is set to be not smaller than 0.8 times as large as (360°/the number of cutting edges) in a case of the taper reamer having cutting edges of not less than four blades. Furthermore, it is preferable that the angle difference between the maximum and minimum helix angles is set to be 5° or less.

DESCRIPTION OF THE REFERENCE NUMERAL 1 taper reamer
2 shank portion
3 cutting-edge portion (tapered portion)
11 first cutting edge
12 second cutting edge
13 third cutting edge
21 chip removal flute
S Front end (reference position)
K rear end
D angle difference
T revolving direction
θ1 intertooth angle
θ2 intertooth angle
θ3 intertooth angle
α1 helix angle
α2 helix angle
α3 helix angle

The invention claimed is:

1. A taper reamer comprising:
a cutting-edge portion having an external diameter being expanded from a front end toward a rear end of the cutting-edge portion; and
three or more cutting edges each having a helical shape provided on the outer periphery of the cutting-edge portion,
wherein an intertooth angle, defined between each of a pair of the cutting edges adjacently arranged in a circumferential direction, is different from one another at any given reference position,
wherein the three or more cutting edges each have a helix angle that is different from one another,
wherein a chip removal flute is formed between each of a pair of the cutting edges adjacently arranged in a circumferential direction, and
wherein at least one of the intertooth angles is defined to be decreased from the front end toward the rear end, while the remaining intertooth angles are defined to be increased from the front end toward the rear end.

2. The taper reamer according to claim 1, wherein said given reference position is set to be at the front end of the cutting-edge portion.

3. The taper reamer according to claim 2,
wherein the number of the cutting edges is three, and
wherein one of the three intertooth angles is defined to be decreased from the front end toward the rear end, while the remaining two intertooth angles are defined to be increased from the front end toward the rear end, and a minimal intertooth angle at the rear end of the cutting edge portion is defined to be not smaller than 0.5 times as large as 120°.

4. The taper reamer according to claim 3, wherein the minimal intertooth angle at the rear end of the cutting-edge portion is defined to be not smaller than 0.8 times as large as 120°.

5. The taper reamer according to claim 4, wherein
the three cutting edges, defined as first to third cutting edges, each have a helix angle that is different from one another,
the third cutting edge is arranged next to the first cutting edge with reference to a revolving direction of the first cutting edge, and the second cutting edge is arranged next to the first cutting edge with reference to a counter-revolving direction of the first cutting edge,
the third cutting edge has a helix angle larger than the helix angle of the first cutting edge and the second cutting edge has a helix angle smaller than the helix angle of the first cutting edge, and an intertooth angle defined between the second cutting edge and the third cutting edge is larger than any other intertooth angles at the front end of the cutting-edge portion, and an intertooth angle defined between the first cutting edge and the second cutting edge is smaller than any other intertooth angles at the front end of the cutting-edge portion.

6. The taper reamer according to claim 5, wherein the difference between the helix angle of the third cutting edge and the helix angle of the second cutting edge is smaller than or equal to 5°.

7. The taper reamer according to claim 1,
wherein the number of the cutting edges is three, and
wherein one of the three intertooth angles is defined to be decreased from the front end toward the rear end, while the remaining two intertooth angles are defined to be increased from the front end toward the rear end, and a minimal intertooth angle at the rear end of the cutting edge portion is defined to be not smaller than 0.5 times as large as 120°.

8. The taper reamer according to claim 7, wherein the minimal intertooth angle at the rear end of the cutting-edge portion is defined to be not smaller than 0.8 times as large as 120°.

9. The taper reamer according to claim 8, wherein
the three cutting edges, defined as first to third cutting edges, each have a helix angle that is different from one another,
the third cutting edge is arranged next to the first cutting edge with reference to a revolving direction of the first cutting edge, and the second cutting edge is arranged next to the first cutting edge with reference to a counter-revolving direction of the first cutting edge,
the third cutting edge has a helix angle larger than the helix angle of the first cutting edge and the second cutting edge has a helix angle smaller than the helix angle of the first cutting edge, and
an intertooth angle defined between the second cutting edge and the third cutting edge is larger than any other intertooth angles at the front end of the cutting-edge portion, and an intertooth angle defined between the first cutting edge and the second cutting edge is smaller than any other intertooth angles at the front end of the cutting-edge portion.

10. The taper reamer according to claim 9, wherein the difference between the helix angle of the third cutting edge and the helix angle of the second cutting edge is smaller than or equal to 5°.

\* \* \* \* \*